US011899766B2

(12) United States Patent
Taher et al.

(10) Patent No.: US 11,899,766 B2
(45) Date of Patent: Feb. 13, 2024

(54) USER AUTHENTICATION USING ORIGINAL AND MODIFIED IMAGES

(71) Applicant: International Business Machines Corporation, Armonk, NY (US)

(72) Inventors: Luke Taher, Heswall (GB); Madeleine Frost, Morden (GB); Vinh Tuan Thai, Markham (CA); Paul Barry, Douglas (IE)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 17/201,678

(22) Filed: Mar. 15, 2021

(65) Prior Publication Data

US 2022/0292171 A1 Sep. 15, 2022

(51) Int. Cl.
*G06N 3/08* (2023.01)
*G06V 40/16* (2022.01)
(Continued)

(52) U.S. Cl.
CPC .............. *G06F 21/32* (2013.01); *G06N 3/045* (2023.01); *G06N 3/08* (2013.01); *G06T 7/70* (2017.01); *G06V 20/53* (2022.01); *G06V 40/168* (2022.01); *G06V 40/172* (2022.01); *G06N 3/0464* (2023.01); *G06N 3/0475* (2023.01); *G06N 3/094* (2023.01); *G06N 3/096* (2023.01); *G06V 10/774* (2022.01); *G06V 10/82* (2022.01)

(58) Field of Classification Search
CPC ........ G06N 3/04; G06N 3/045; G06N 3/0463; G06N 3/0464; G06N 3/0475; G06N 3/08; G06N 3/094; G06N 3/096; G06T 7/70; G06V 10/77; G06V 10/774; G06V 10/82; G06V 20/53; G06V 40/16; G06V 40/168; G06V 40/172; G06F 21/32
See application file for complete search history.

(56) References Cited

U.S. PATENT DOCUMENTS 10,402,750 B2 9/2019 Weston
10,771,965 B1 9/2020 Koss
(Continued)

FOREIGN PATENT DOCUMENTS

TW 1687871 B 10/2020

OTHER PUBLICATIONS

PCT/CN2022/074981 International Search Report and Written Opinion, filed Jan. 29, 2022 (dated Apr. 13, 2022).
(Continued)

*Primary Examiner* — D'Arcy Winston Straub
(74) *Attorney, Agent, or Firm* — Richard B. Thomas

(57) ABSTRACT

Method and system are provided for user authentication using original and modified images. The method includes receiving an original image for a user, where the original image is a private image that meets certain configured criteria. The method uses a pre-trained Convolutional Neural Network (CNN) model to extract one or more image features of the original image and feeds the extracted image feature into a Generative Adversarial Network (GAN) image generator to realistically modify the extracted image feature to generate a modified image. The method authenticates a user based on recognition of a presented original image or a presented modified image.

20 Claims, 8 Drawing Sheets

(51) Int. Cl.
*G06F 21/32* (2013.01)
*G06T 7/70* (2017.01)
*G06V 20/52* (2022.01)
*G06N 3/045* (2023.01)
G06N 3/0464 (2023.01)
G06N 3/0475 (2023.01)
G06N 3/094 (2023.01)
G06V 10/774 (2022.01)
G06N 3/096 (2023.01)
G06V 10/82 (2022.01)

(56) References Cited

U.S. PATENT DOCUMENTS

| | | | | |
|---|---|---|---|---|
| 11,196,930 | B1* | 12/2021 | Svendsen | H04N 23/60 |
| 11,562,243 | B2* | 1/2023 | He | G06N 3/042 |
| 2008/0148366 | A1 | 6/2008 | Wahl | |
| 2014/0119672 | A1 | 5/2014 | Ioffe | |
| 2014/0230046 | A1* | 8/2014 | Dewan | G06V 40/172 726/19 |
| 2014/0237570 | A1 | 8/2014 | Shishkov | |
| 2017/0098067 | A1* | 4/2017 | Paluri | G06F 21/31 |
| 2019/0014148 | A1 | 1/2019 | Foster | |
| 2019/0122072 | A1 | 4/2019 | Cricri | |
| 2019/0236614 | A1 | 8/2019 | Burgin | |
| 2019/0295302 | A1 | 9/2019 | Fu | |
| 2020/0012896 | A1 | 1/2020 | Yoo | |
| 2020/0184053 | A1* | 6/2020 | Kursun | G06V 10/764 |
| 2020/0302251 | A1 | 9/2020 | Shechtman | |
| 2021/0201075 | A1* | 7/2021 | Pahde | G06T 17/20 |
| 2022/0237838 | A1* | 7/2022 | Liu | G06N 3/063 |

OTHER PUBLICATIONS

Choi et al., "StarGAN: Unified Generative Adversarial Networks for Multi-Domain Image-to-Image Translation," arXiv:1711. 09020v3 [cs.CV], Sep. 21, 2018, 15 pages. <https://arxiv.org/pdf/1711.09020.pdf>.

Dhamija et al., "Deja Vu: A User Study Using Images for Authentication," Proceedings of the 9th USENIX Security Symposium, Aug. 2000, 14 pages. <https://netsec.ethz.ch/publications/papers/usenix.pdf>.

Gatys et al., "A Neural Algorithm of Artistic Style," arXiv:1508. 06576v2 [cs.CV], Sep. 2, 2015, 16 pages. <https://arxiv.org/abs/1508.06576>.

He et al., "Deep Residual Learning for Image Recognition," arXiv:1512. 03385v1 [cs.CV], Dec. 10, 2015, 12 pages. <https://arxiv.org/pdf/1512.03385.pdf>.

Karras et al., "Analyzing and Improving the Image Quality of StyleGAN," arXiv: 1912.04958v2 [cs.CV], Mar. 23, 2020, 21 pages. <https://ibm.anaqua.com/anaqua/Invention/InventionDocuments.aspx?RecordId=96138281>.

Lee et al., "Context-Aware Synthesis and Placement of Object Instances," arXiv:1812.02350v2 [cs.CV], Dec. 7, 2018, 11 pages. <https://arxiv.org/pdf/1812.02350.pdf>.

Luan et al. "Deep Photo Style Transfer," arXiv:1703.07511v3 [cs.CV], Apr. 11, 2017, 9 pages. <https://arxiv.org/pdf/1703.07511.pdf>.

Ma et al., "Pose Guided Person Image Generation," arXiv:1705. 09368v6 [cs.CV], Jan. 28, 2018, 11 pages. <https://arxiv.org/pdf/1705.09368.pdf>.

Mell et al., "The NIST Definition of Cloud Computing," Recommendations of the National Institute of Standards and Technology, U.S. Department of Commerce, Special Publication 800-145, Sep. 2011, 7 pages.

Simonyan et al., "Very Deep Convolutional Networks for Large-Scale Image Recognition," ICLR 2015, arXiv:1409.1556v6 [cs.CV], Apr. 10, 2015, 14 pages. <https://arxiv.org/pdf/1409.1556.pdf>.

* cited by examiner

USER AUTHENTICATION USING ORIGINAL AND MODIFIED IMAGES

BACKGROUND

The present disclosure relates to user authentication, and more specifically, to user authentication using original and modified images.

User authentication is required for a wide range of situations in which a user's authenticity is verified. For example, authentication may be required to access social media accounts or other digital platforms.

Social media accounts are frequently attacked and once access is stolen this can cause grave consequences to account owners. Hence, many authentication mechanisms are in use with the key requirements being that such mechanisms need to be both robust and usable.

Two factor authentication is commonly used to address this problem, and typically relies on something the user knows (e.g. personal information/special phrases) and something the user has (e.g. an additional mobile device). This approach has the limitations that the personal information can be harvested or known and special phrases are often forgotten (as they are rarely used). Furthermore, an additional mobile device may be unavailable, lost or stolen.

SUMMARY

According to an aspect of the present disclosure, there is provided a computer-implemented method for user authentication using original and modified images, comprising: receiving an original image for a user; generating a modified image of the original image by applying a pre-trained Convolutional Neural Network (CNN) model to extract one or more image features of the original image, and feeding the extracted image feature into a Generative Adversarial Network (GAN) image generator to realistically modify the extracted image feature to generate the modified image; and authenticating a user based on recognition of a presented original image or a presented modified image.

According to another aspect of the present disclosure, there is provided a system for user authentication using original and modified images, comprising: a processor and a memory configured to provide computer program instructions to the processor to execute the function of the components: an image receiving component for receiving an original image for a user; an original image feature extraction component for using a pre-trained Convolutional Neural Network (CNN) model to extract one or more image features of the original image; a modified image generating component for feeding the extracted image feature into a Generative Adversarial Network (GAN) image generator to realistically modify the extracted image feature to generate a modified image; and an image set supplying component for supplying an image set of original and modified images to an authentication component for authenticating a user based on recognition of a presented original image or presented modified image.

According to another aspect of the present disclosure, there is provided a computer program product for user authentication using original and modified images, the computer program product comprising a computer readable storage medium having program instructions embodied therewith, the program instructions executable by a processor to cause the processor to: receive an original image for a user; apply a pre-trained Convolutional Neural Network (CNN) model to extract one or more image features of the original image; feed the extracted image feature into a Generative Adversarial Network (GAN) image generator to realistically modify the extracted image feature to generate a modified image; and authenticate a user based on recognition of a presented original image or a presented modified image.

The computer readable storage medium may be a non-transitory computer readable storage medium and the computer readable program code may be executable by a processing circuit.

BRIEF DESCRIPTION OF THE DRAWINGS

The subject matter regarded as the disclosure is particularly pointed out and distinctly claimed in the concluding portion of the specification. The disclosure, both as to organization and method of operation, together with objects, features, and advantages thereof, may best be understood by reference to the following detailed description when read with the accompanying drawings.

Preferred embodiments of the present disclosure will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described user authentication mechanism defines a security technique that is able to authenticate a user based on their ability to identify the real images out of a collection of both original images and modified (fake) images. The images used in this method are a set of private memorable images uploaded by the user.

This security approach makes use of a deep learning model called Convolutional Neural Networks (CNNs), that can be trained on large sets of images to produce generative models. Once trained, CNNs have many useful applications that can be utilized to generate the set of modified but photorealistic images based on the original ones uploaded by the user. Generative Adversarial Networks (GANs) are a state-of-the-art training approach in this domain that can be used to realistically modify images. A GAN is formed of a pair of CNNs, where one is a generator network and one is a discriminator network. Examples of modifications that can be performed by GANs include changing the background of the image or changing the hair color, facial expression, and pose of those pictured. Together, these deep learning models are able to generate the set of fake modified images used in this method to verify the identity of the user.

A mixture of both the user's original unaltered images and the modified generated images are presented to the user when authentication is required, where only the real account owner will be able to identify those that are the real original images.

The image authentication mechanism may be used as an additional authentication factor to augment existing authentication methods. For example, it may be used as an additional random spot-check, or when someone tries to recover their account after forgetting their password or after their account was hacked.

Figure 1:
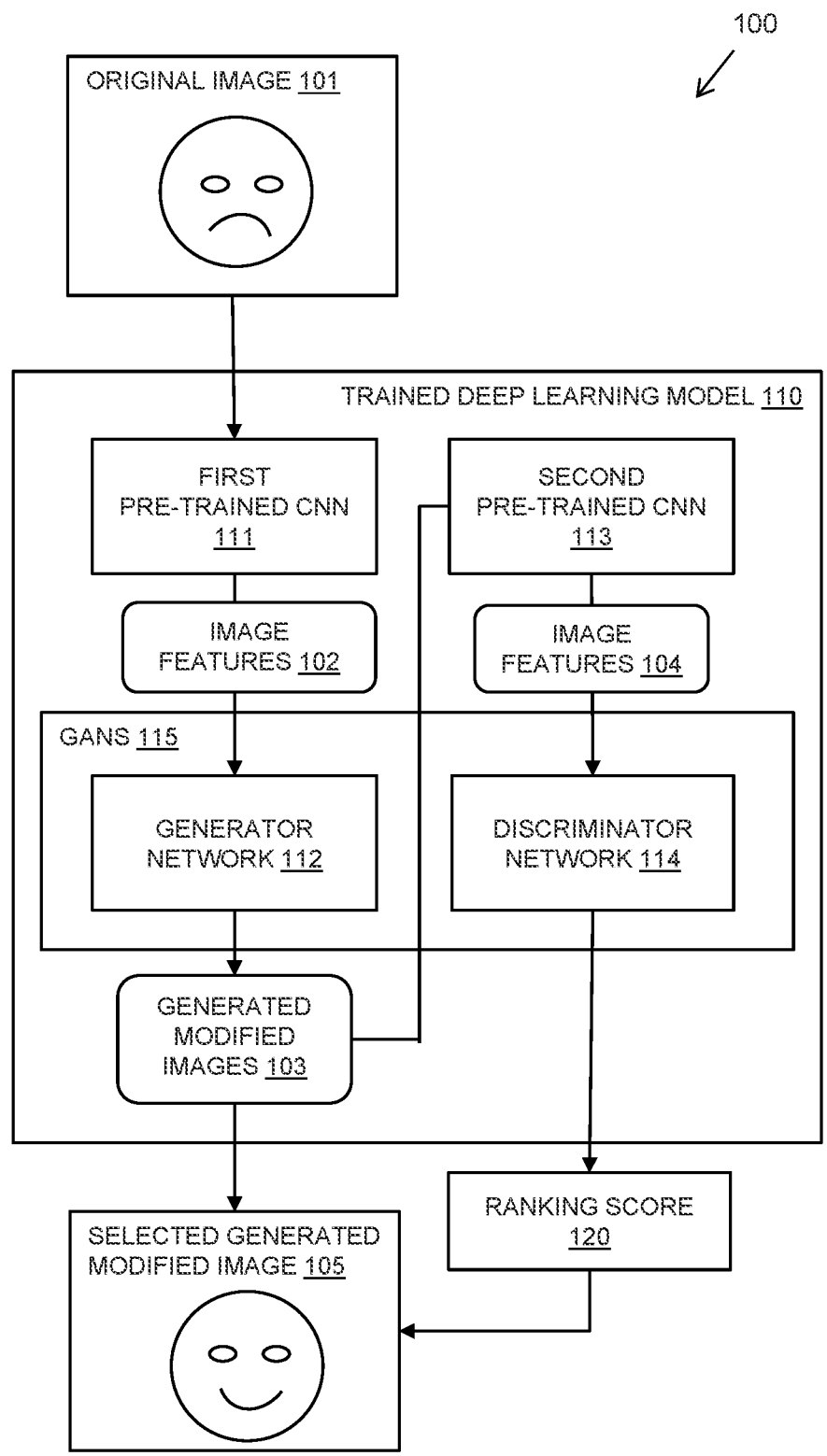
FIG. 1 is a schematic diagram of an example embodiment of a flow of a method in a modeling system in accordance with an aspect of the present disclosure.

Referring to FIG. 1, a schematic diagram 100 illustrates an example embodiment of a trained deep learning model 110 of the described method.

A trained deep learning model 110 is pre-trained on large scale data. CNN models used in image processing are trained on large scale data and these CNN models are used in a technique called transfer learning involving removing the top layer of a trained CNN model and feeding the outputs of the last layer into a new network where they can be used as extracted features. The transfer learning technique is used in the described method to feed the extracted features of images into generators in different GANs. The generator in each GAN is trained to make photorealistic modifications on a set of training images such that the discriminator is not able to distinguish between those that have been modified and those that have not. By the end of the training phase, each generator is specialized in creating realistic modified images for their specific modification, thereby each generator is trained to realistically modify images through the extracted image features to generate the modified images. The generator and discriminator may be referred to as a generator network and discriminator network as they use appropriate network architectures.

An original image 101 is input for a user into the trained deep learning model 110.

The trained deep learning model 110 includes a first pre-trained CNN 111 that extracts one or more image features 102 of the original image 101. The image features may be semantic features in the form of objects or concepts in the image.

The image features 102 are fed into a plurality of GANs 115, each in the form of a generator network 112 and a discriminator network 114, to realistically modify the extracted image features to generate a plurality of modified images 103. The method uses a transfer learning technique to feed the extracted image features 102 into a generator network 112 of a GAN 115. The generator network 112 in the GAN 115 is trained to make photorealistic modifications such that a discriminator network 114 is not able to distinguish between those that have been modified and those that have not. A set of GANs 115 may be provided with each GAN 115 specializing in performing one of the proposed image modifications, such as changing the background, hair color, facial expression, and pose. Each GAN 115 would have its own generator network 112 and discriminator network 114.

The generated modified images 103 are passed into a second pre-trained CNN 113 where the transfer learning technique is used to once again extract image features 104 of the modified images 103 where the output is passed into the discriminator networks 114 of each of the GANs 115 that is trained to recognize generated modified images.

The output of the discriminator networks 114 is used to provide a ranking score 120 for the generated modified images 103 to select the best generated modified image 105 for the original image 101 from the various modified images provided by different GANs 115.

In an example embodiment, each discriminator network 114 provides a score for the generated modified image from its respective generator network 112, with each GAN 115 producing a single decimal score between 0 and 1. These scores are normalized and can be used to rank the generated modified images 103 and produce a ranking score 120 for each generated image 103.

For example: GAN 1: Generator 1 generates modified image 1 and Discriminator 1 scores image 1 0.33; GAN 2: Generator 2 generates modified image 2 and Discriminator 2 scores image 2 0.74; GAN 3: Generator 3 generates modified image 3 and Discriminator 3 scores image 3 0.98. This gives a Ranking Score: $1^{st}$ (Best) Image 3; $2^{nd}$ Image 2; $3^{rd}$ Image 1.

Figure 2A:
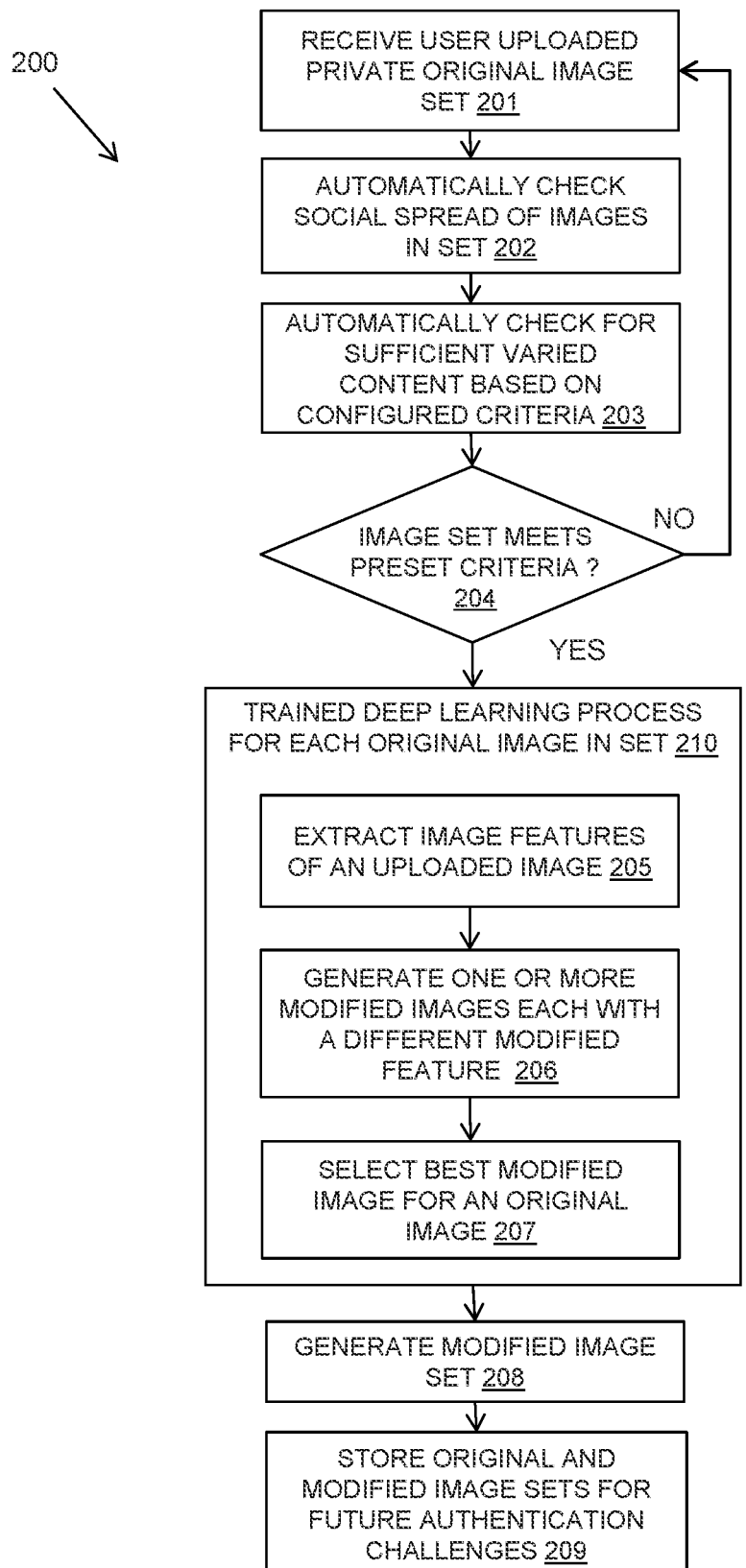
FIGS. 2A and 2B are flow diagrams of an example embodiment of an aspect of a method in accordance with the present disclosure.
Figure 2B:
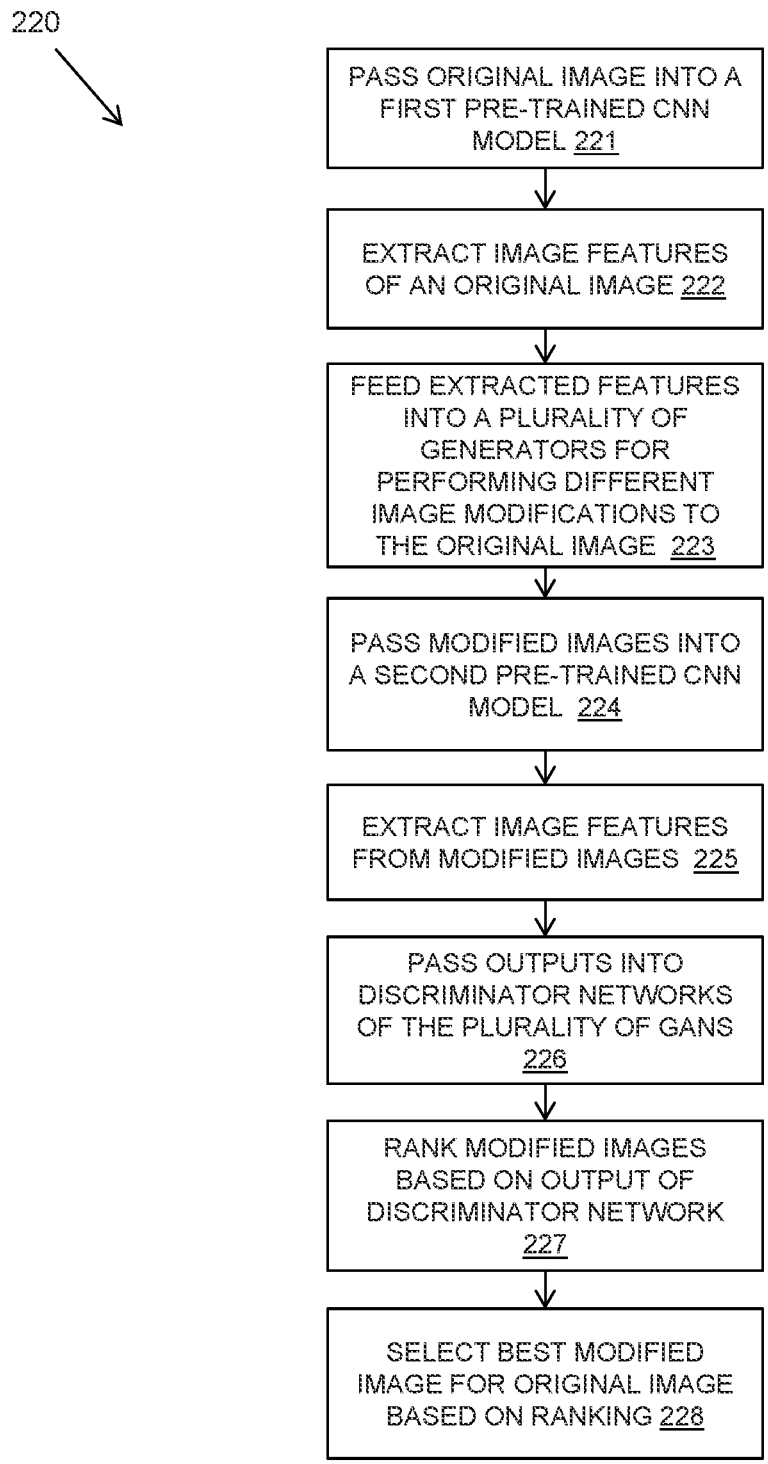

Referring to FIGS. 2A and 2B, flow diagrams 200, 220 show an example embodiment of a method of processing images for a user authentication method.

The user uploads a set of private and memorable images to the platform. The method receives 201 an uploaded set of original images for a user. The original images may be uploaded during an initial registration process and as later required to keep the number of images in a set at a required level.

The set of original images may be required to meet certain criteria. For the original images to be useful in future authentication, the images are marked as secret or private and will not be shared with anyone, even friends in a same social network.

The following privacy and recognition criteria for the original images are likely to be required to be met:
  Memorable: The images should not be one of regular occurrences, e.g., one taken in a pub, as it would make it hard for the user themselves to remember.
  Have not been shared before: It is important that an attacker could not gain access to these images.
  Have personal significance: The images should have meaning and be recognizable as their own.

The method may automatically check 202 a social spread of images in an original image set for a user. This social spread criterion may be determined automatically by the system to ensure that the set of images contains, for example, three or more separate social circles: The original image set as a whole may be determined to contain pictures of people, e.g., contacts from three separate social circles such as friends, family, and work colleagues. A strength of this criterion is determined automatically referencing a social graph of contacts that may be provided by a social network platform. For example, this may be a social network platform that the user is being authenticated for.

In one embodiment, this automatic evaluation of social spread may use facial recognition to identify which friends of the user are featured in each image. The distance between the social circles in each image may then be identified as the shortest path between the two subgraphs within the social graph. The distance between three images within the image set should exceed a configurable threshold distance, including comparing the shortest path to the configurable threshold distance requirement. The larger the threshold distance, the stronger the security of the technique. This information may be fed back to the user in real time as they upload images to their image set and inform them as to whether they need to add more distinct images.

The method may also automatically check 203 for a sufficiently varied content of the set of original images for the user based on configured criteria. A set of content variation criteria may be provided so that the set of original images includes images that are varied in content in order to facilitate the application of different modifications using the style transfer technique employed to generate modified images.

For application of the modifications discussed, and extensibility to future modifications, the following preferred content variation criteria may be applied for the set of images uploaded by the user:

An image with a clear and recognizable background: One of the images should be taken outdoors with the background clearly shown, rather than pictures against a blank background or "portrait mode" images that have the background blurred out. This will be suitable for changes of weather/season and time of day.

An image taken in a well-known location or landmark: Suitable for changes of weather/season and time of day.

A self-portrait or "selfie": This is quick and easy for the user to provide and is incredibly secure provided no one else is present. The user additionally could be asked to pull a memorable facial expression. This will be suitable for changes of the facial expression, facial features, and hair color.

A full body image: This is likely to provide an image suitable for pose modification. Additionally, as generative placement of objects in images improves, these images may also prove a suitable candidate for other such modifications.

This set of content variation criteria may be more lenient than the privacy and recognition criteria and the social spread criterion. Depending on the quantity of images uploaded it may be the case that a comprehensive subset of the content variation criteria provides sufficient security. This may be configurable.

The method may determine 204 if a user's set of original images meets the preset criteria and may request additional original images if these are not met.

Once uploaded and having met the previous criteria, the set of the user's private original images is fed into one or more of the trained networks. Each image will then have the set of proposed modifications applied to it by multiple generators.

The method may use a trained deep learning modeling process 210 for each original image to extract 205 image features from an original image, generate 206 one or more modified images for the original image by modifying a different feature of the original image, and select 207 a best modified image for the original image.

A set of modified images is generated 208 for the set of original images of the user and the original and modified image sets are stored 209 for future authentication challenges.

An image presented to the user for authentication may be a random selection from their original images and the generated images with the best modifications. The authentication mechanism involves the user identifying which images are real and which are generated. The user is successfully authenticated if they are able to correctly identify the images within some configurable error threshold.

Referring to FIG. 2B, the flow diagram 220 shows further details of an example embodiment of the modeling process 210 of FIG. 2A using pre-trained CNN models and a technique called transfer learning. The CNN models may be pre-trained on large scale data. These models are of significant benefit to downstream tasks such as object/person recognition, semantic segmentation, etc., via a technique called transfer learning. This technique involves removing the top layer of a trained CNN model and feeding the outputs of the last layer into a new network where they can be used as extracted features.

An original image is passed 221 into a first pre-trained CNN model to extract 222 image features from each original image.

The method uses the transfer learning technique to feed 223 the extracted features into multiple generators in different GANs that each specialize in performing one of the proposed image modifications, such as changing the background, hair color, facial expression, or pose. The generator in each GAN has been trained to make photorealistic modifications on a set of training images such that a discriminator is not able to distinguish between those that have been modified and those that have not. By the end of the training phase, each generator is specialized in creating realistic modified images for their specific modification.

The generated modified images are passed 224 into a second pre-trained CNN where the transfer learning technique is again used to extract 225 the features of the image, but this time the output is passed 226 into the plurality of discriminator networks of the GANs trained to recognize generated modified images.

The normalized logit output of each discriminator will then be used to rank 227 the modifications to determine which one was the most realistic and gave the best result. This modified image is selected 228 as the best modification for the original image.

Figure 3:
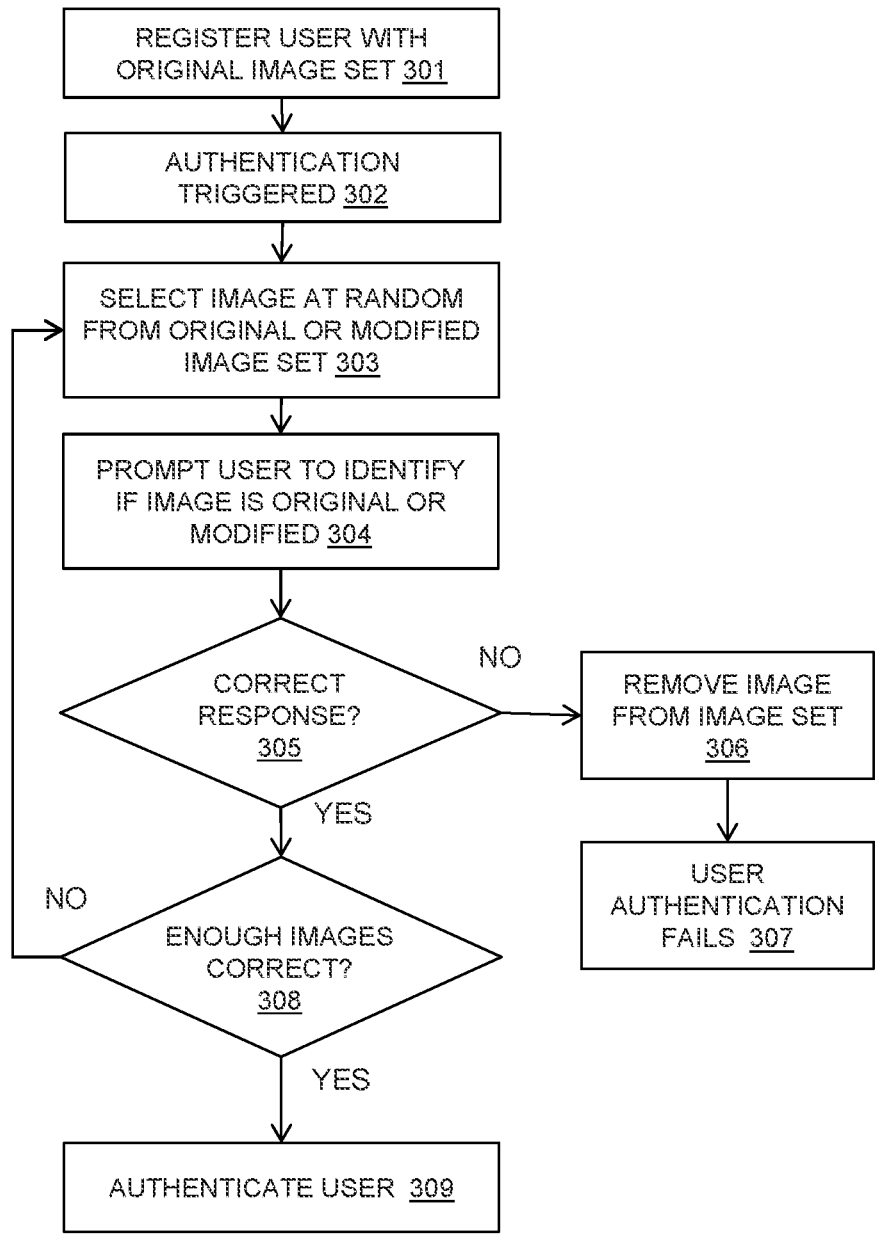
FIG. 3 is a flow diagram of an example embodiment of another aspect of a method in accordance with the present disclosure.

Referring to FIG. 3, a flow diagram 300 shows an example embodiment of a user authentication method using the original images and the generated modified images of a user.

The method may register 301 a user with an original image set. The original image set may be added to in order to maintain a sufficient number of original images in the set for the user as images may be removed once they have been used in a failed authentication attempt to prevent public disclosure of an image.

An authentication may be triggered 302, for example, as an additional authentication check for a user of an account such as a social media account or other online account.

The method may select 303 an image at random from a combined set of the original image set of the user and a set of modified images based on the original image set as generated by the described method. The user may be prompted 304 to identify if the presented image is an original image or a modified image.

It may be determined 305 if the response is correct. If the response is not correct, the presented image is removed 306 from the image set and the user authentication fails 307. If an image identification fails or is aborted, then any presented images shown are invalidated. This condition prevents a brute force attack on the mechanism by ensuring that an attacker would never see the same presented image twice.

If the response is correct, it is determined 308 if a sufficient number of presented images have been correctly identified as configured for the authentication, for example, a correct identification of three images may be configured to be required. If an insufficient number of presented images have been identified, the method may loop to select 303 a next image at random for presentation to the user. Once a sufficient number of presented images have been correctly identified through the determination operation 308, the user may be authenticated 309.

A monitor on the number of available images for presentation may be maintained in order to request more original images from a user when the supply is becoming depleted. If the set of images is completely depleted, the authentication mechanism may be lock By presenting only one image at a time, where the user must correctly identify the image before being shown another, it is ensured that the set of images is not depleted quickly through user error. Only the subset of images shown would need to be invalidated in the case of a failed authentication attempt.

The described authentication has various advantages. It is stronger than a set of static secondary security questions. Those questions can usually be answered by someone who has known the account owner over a long period of time. The described method ensures that images uploaded are from different social circles and so no single individual is likely to have prior knowledge of a sufficient quantity of images to pass the security check.

The described method is a visual authentication method that does not require a user to recall any other information. The described method is highly usable as it is based on personal yet unsensitive data. It will only be obvious to the real account owner which images have been modified and are therefore fake, allowing them to quickly authenticate their account. Importantly, this approach does not encourage a user to write down any secret information, such as passwords or answers to security questions in a file or on a paper note which can present a security risk.

A set of images presented containing at least three of the user's social circles reduces the likelihood that anyone who knows the user well would be able to correctly identify all of the images. For example, it is unlikely that a partner would be able to identify the changed facial expression of a co-worker.

The method is easy for a user to implement as all users, particularly in the context of social media accounts, will have images they can upload. It also does not depend on the availability of a mobile phone or any other device to receive or generate a one-time passcode. People who have lost their phones or do not own one would not be able to receive this passcode.

Figure 4:
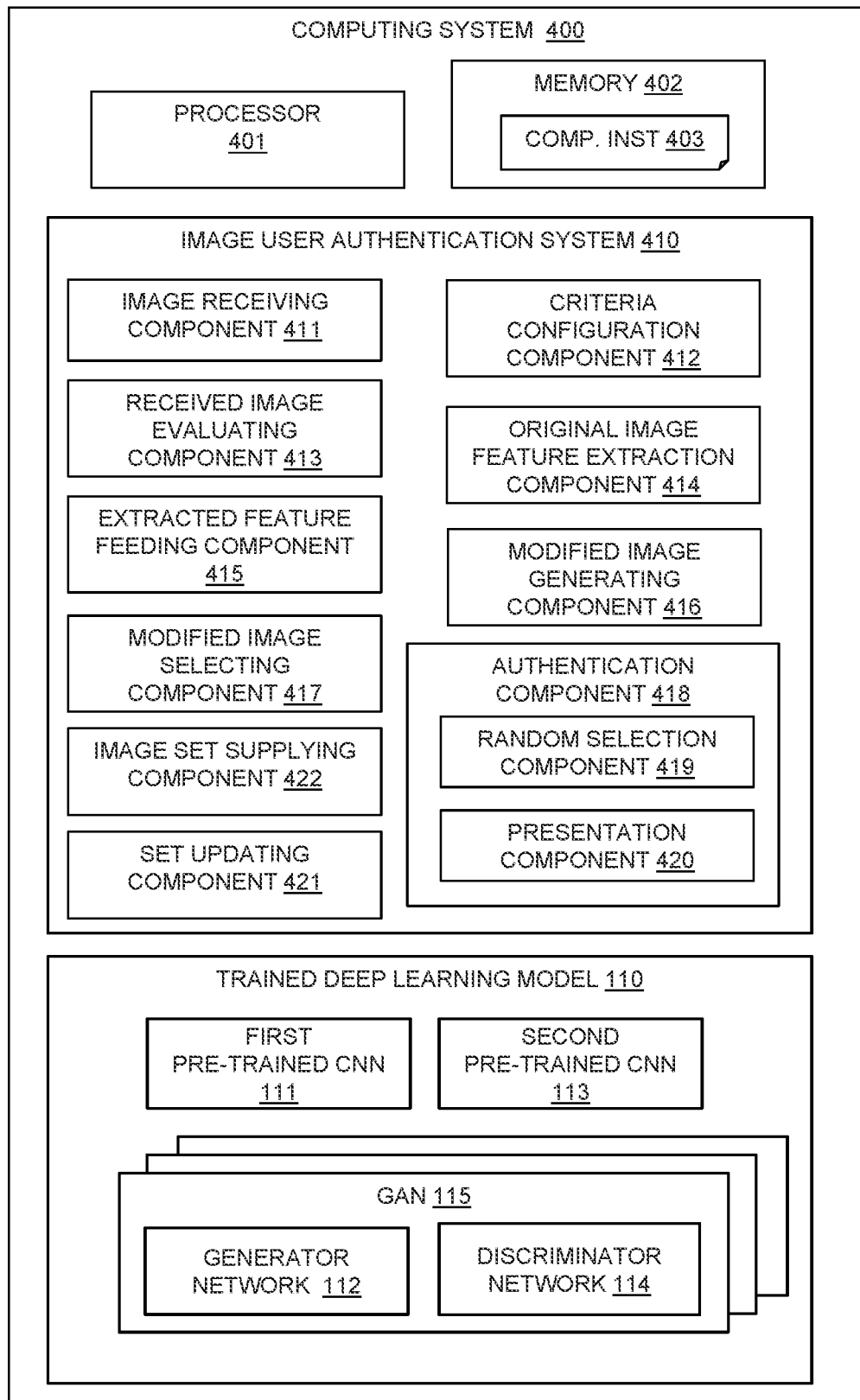
FIG. 4 is block diagram of an example embodiment of a system in accordance with the present disclosure.

Referring to FIG. 4, a block diagram shows an example embodiment of the described system.

A computing system 400 includes at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The trained deep learning model 110 may be provided at or accessed from the computing system 400 and includes a first pre-trained CNN 111, multiple GANs 115 each including a generator network 112 and a discriminator network 114, and a second pre-trained CNN 113, as previously described.

An image user authentication system 410 may be provided at the computing system 400 and may include the following components. An image receiving component 411 may receive original images for a user. The image receiving component 411 may evaluate received images to ensure they meet any required criteria for suitable original images. A criteria configuration component 412 may apply a set of configurable criteria to a set of original images to check that the set of original images are suitable for the image feature extraction and modification.

A received image evaluating component 413 may evaluate a received set of original images to ensure that they meet the configured criteria. This may include evaluating a social distance between people in each of a subset of the original images to ensure this is above a threshold social distance. Where the user authentication is for a social media platform, the received image evaluating component 413 may use a social graph of the user's social media account to determine social distances between people in the original images.

An original image feature extraction component 414 may use a first pre-trained CNN model to extract one or more image features of an original image. An extracted feature feeding component 415 may feed an extracted image feature into each of a set of different GAN image generators to carry out a set of different image modifications and a modified image generating component 416 may generate modified images. A modified image selecting component 417 may select a modified image for an original image from the multiple modified images using a second pre-trained CNN 113 to extract image features from the multiple modified images and passing these to a discriminator network 114 to rank the plurality of modified images.

An image set supplying component 422 may supply an image set of original and modified images for a user to an authentication component 418.

The authentication component 418 may authenticate or may fail a user based on recognition of a presented original image or presented modified image. The authentication component 418 include a random selection component 419 for randomly selecting an image from a combination of the set of original images and the set of modified images for authentication of the user and a presentation component 420 for presenting the image to a user.

A set updating component 421 may remove an image from a combination of the set of original images and the set of modified images after being invalidated as not recognized by a user for authentication and may add additional original images to the set of original images when the number in the set reaches a threshold.

Figure 5:
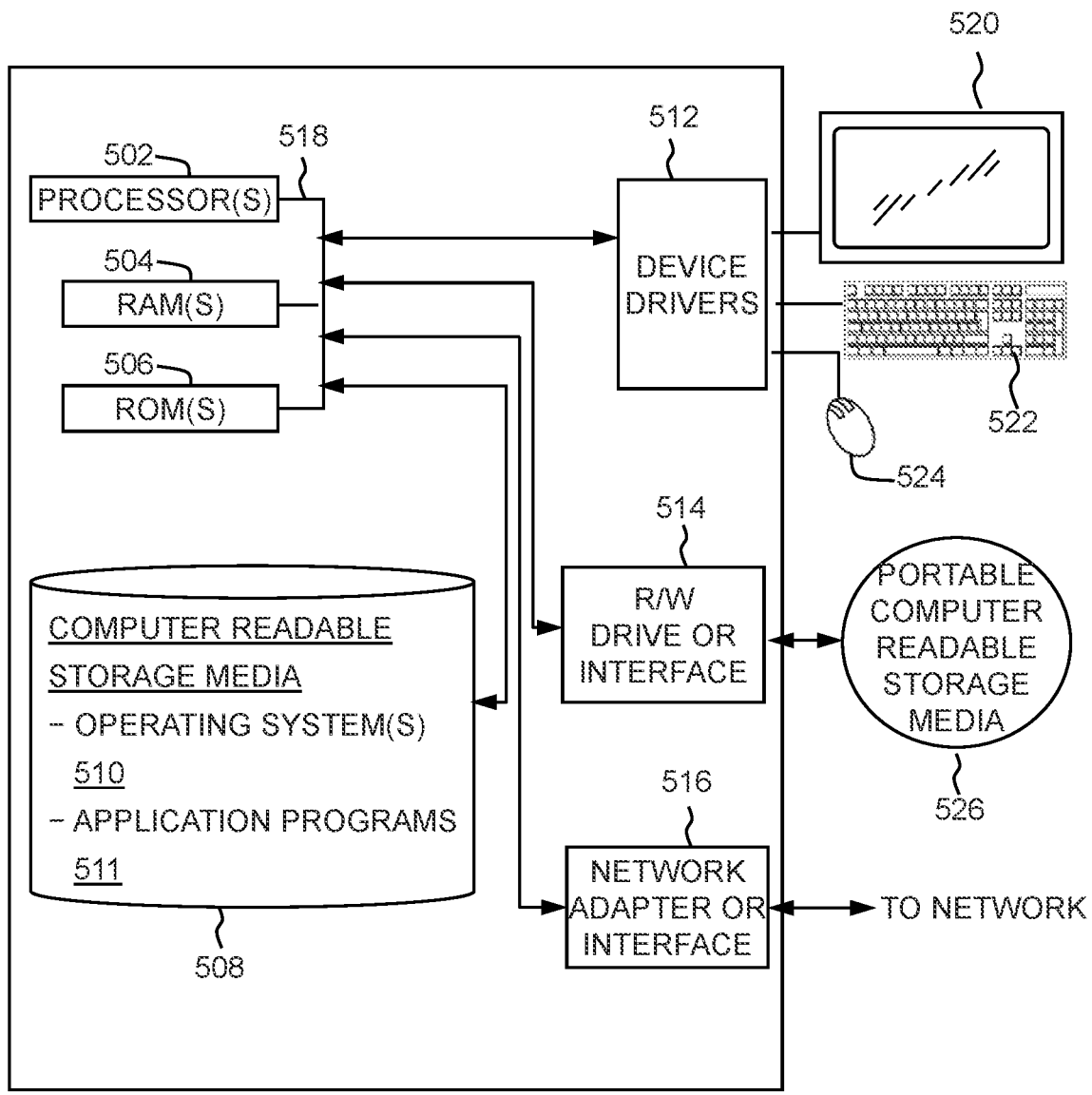
FIG. 5 is a block diagram of an embodiment of a computer system or cloud server in which the present disclosure may be implemented.

FIG. 5 depicts a block diagram of components of a computing system 400 as used for the image user authentication system 410 and trained deep learning model 110, in accordance with an embodiment of the present disclosure. It should be appreciated that FIG. 5 provides only an illustration of one implementation and does not imply any limitations with regard to the environments in which different embodiments may be implemented. Many modifications to the depicted environment may be made.

The computing system can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the image user authentication system 410 and the trained deep learning model 110 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the disclosure.

The computing system can also include a R/W drive or interface 514 to read from and write to one or more portable computer readable storage media 526. Application programs 511 on the computing system can be stored on one or more of the portable computer readable storage media 526, read via the respective R/W drive or interface 514 and loaded into the respective computer readable storage media 508.

The computing system can also include a network adapter or interface 516, such as a TCP/IP adapter card or wireless communication adapter. Application programs 511 on the computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
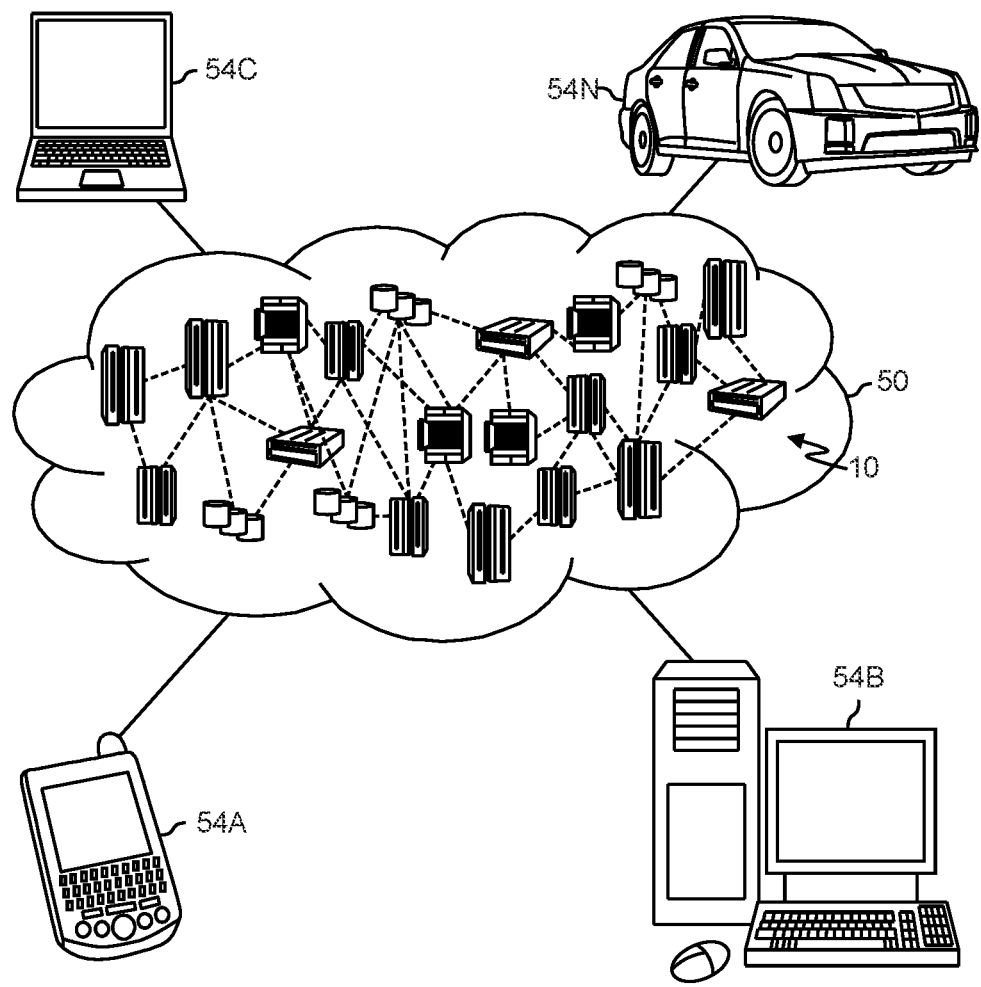
FIG. 6 is a schematic diagram of a cloud computing environment in which the present disclosure may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
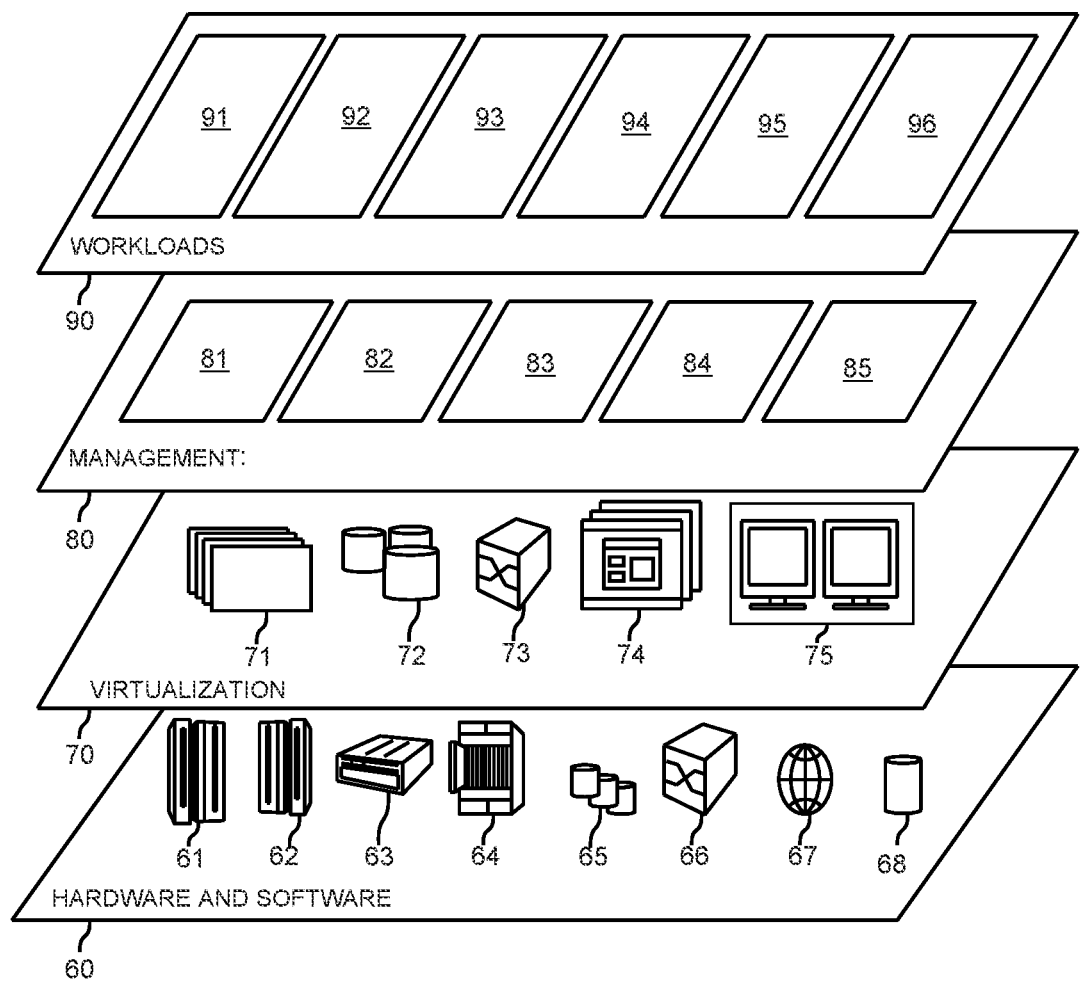
FIG. 7 is a diagram of abstraction model layers of a cloud computing environment in which the present disclosure may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image modeling and user authentication processing 96.

A computer program product of the present disclosure comprises one or more computer readable hardware storage devices having computer readable program code stored therein, said program code executable by one or more processors to implement the methods of the present disclosure.

A computer system of the present disclosure comprises one or more processors, one or more memories, and one or more computer readable hardware storage devices, said one or more hardware storage device containing program code executable by the one or more processors via the one or more memories to implement the methods of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer-implemented method for user authentication using original and modified images, comprising:
   receiving an unaltered original image for a user, wherein the unaltered original image has not been previously shared;
   generating a modified image of the unaltered original image by applying a pre-trained Convolutional Neural Network (CNN) model to extract one or more image features of the unaltered original image, and feeding the one or more extracted image features into a Generative Adversarial Network (GAN) image generator to modify the one or more extracted image features to generate the modified image; and
   authenticating a user based on recognition of a presented unaltered original image or a presented modified image.

2. The method as claimed in claim 1, including:
   feeding the one or more extracted image features into each of a set of different Generative Adversarial Network (GAN) image generators to carry out a set of different image modifications to generate multiple modified images from a single unaltered original image; and
   selecting a modified image for an original image from the multiple modified images.

3. The method as claimed in claim 2, wherein selecting a modified image from the multiple modified images uses a second pre-trained CNN to extract image features from the multiple modified images and pass these to a discriminator to rank a plurality of modified images.

4. The method as claimed in claim 1, including:
receiving a set of unaltered original images for the user;
generating a set of modified images based on the set of unaltered original images; and
randomly selecting an image from a combination of the set of unaltered original images and the set of modified images for authentication of the user.

5. The method as claimed in claim 4, including:
removing an image from a combination of the set of unaltered original images and the set of modified images after being used for a failed authentication of the user;
adding additional unaltered original images to the set of unaltered original images when a number in the set reaches a threshold; and
generating a modified image of an additional unaltered original image.

6. The method as claimed in claim 4, including:
evaluating a received set of unaltered original images to evaluate a social distance between people in each of a subset of the unaltered original images to ensure the social distance is above a configurable threshold social distance requirement.

7. The method as claimed in claim 6, wherein evaluating includes:
using facial recognition to identify people featured in each of at least a subset of the unaltered original images;
referencing a social graph of contacts of the user;
determining a social distance between the people in each unaltered original image as a shortest path between a subgraph of each unaltered original image within the social graph; and
comparing the shortest path to the configurable threshold distance requirement.

8. The method as claimed in claim 4, including:
applying a set of configurable criteria to the set of unaltered original images to check that the set of unaltered original images meet the configurable criteria for the image feature extraction and modification.

9. The method as claimed in claim 1, wherein the unaltered original image that has not been shared is a private image.

10. A system for user authentication using original and modified images, comprising:
a processor and a memory configured to provide computer program instructions to the processor, the program instructions executable by the processor to cause the processor to:
an image receiving component for receiving an original image for a user;
receive an unaltered original image for a user, wherein the unaltered original image has not been previously shared;
use a pre-trained Convolutional Neural Network (CNN) model to extract one or more image features of the unaltered original image;
feed the one or more extracted image features into a Generative Adversarial Network (GAN) image generator to modify the one or more extracted image features to generate a modified image; and
supply an image set of unaltered original and modified images to an authentication component for authenticating the user based on recognition of a presented unaltered original image or presented modified image.

11. The system as claimed in claim 10, wherein the program instructions executable by the processor further cause the processor to:
feed an extracted image feature of the one or more extracted image features into each of a set of different Generative Adversarial Network (GAN) image generators to carry out a set of different image modifications to generate multiple modified images from a single unaltered original image; and
select a modified image from the multiple modified images.

12. The system as claimed in claim 11, wherein the program instructions executable by the processor further cause the processor to:
select a modified image from the multiple modified images using a second pre-trained CNN to extract image features from the multiple modified images and pass these to a discriminator to rank a plurality of modified images.

13. The system as claimed in claim 10, wherein the program instructions executable by the processor further cause the processor to:
receive a set of unaltered original images for the user,
generate a set of modified images based on the set of unaltered original images; and
provide a combined set of the set of unaltered original images and the set of modified images for authentication of the user.

14. The system as claimed in claim 13, wherein the program instructions executable by the processor further cause the processor to:
randomly select an image from a combination of the set of unaltered original images and the set of modified images for the authentication of the user.

15. The system as claimed in claim 13, wherein the program instructions executable by the processor further cause the processor to:
remove an image from a combination of the set of unaltered original images and the set of modified images after being used for the authentication of the user and for adding additional unaltered original images to the set of unaltered original images when the number in the set reaches a threshold.

16. The system as claimed in claim 13, wherein the program instructions executable by the processor further cause the processor to:
evaluate a received set of unaltered original images to evaluate a social distance between people in each of a subset of the unaltered original images to ensure the social distance is above a configurable threshold social di stance requirement.

17. The system as claimed in claim 16, wherein the program instructions executable by the processor further cause the processor to:
use a social graph of a social media account of the user to determine social distances between people in the original images.

18. The system as claimed in claim 13, wherein the program instructions executable by the processor further cause the processor to:
apply a set of configurable criteria to the set of unaltered original images to check that the set of unaltered original images meet the configurable criteria for the image feature extraction and modification.

19. The system as claimed in claim 10, wherein the program instructions executable by the processor further cause the processor to:
  trigger an additional authentication check for the user.

20. A computer program product for user authentication using unaltered original and modified images, the computer program product comprising a computer readable storage medium having program instructions embodied therewith, the program instructions executable by a processor to cause the processor to:
  receive an unaltered original image for a user, wherein the unaltered original image has not been previously shared;
  apply a pre-trained Convolutional Neural Network (CNN) model to extract one or more image features of the unaltered original image;
  feed the one or more extracted image features into a Generative Adversarial Network (GAN) image generator to modify the one or more extracted image features to generate a modified image; and
  authenticate the user based on recognition of a presented unaltered original image or a presented modified image.

\* \* \* \* \*